Figure 1:
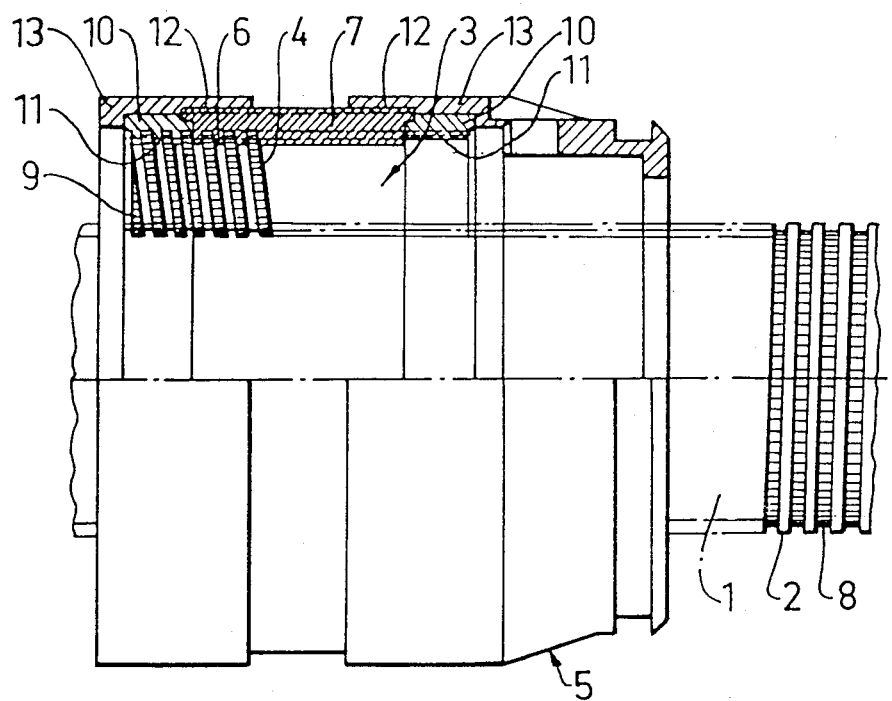

United States Patent [19]

Granbom

[11] Patent Number: 4,615,229
[45] Date of Patent: Oct. 7, 1986

[54] DEVICE FOR TRANSLATING A ROTARY MOTION TO A LINEAR ONE

[76] Inventor: Bo Granbom, 13 Lostigen, S-731 42 Köping, Sweden

[21] Appl. No.: 712,255

[22] Filed: Mar. 15, 1985

[30] Foreign Application Priority Data

Mar. 16, 1984 [SE] Sweden .................................. 8401481

[51] Int. Cl.⁴ .............................................. F16H 25/22
[52] U.S. Cl. .................................. 74/424.8 C; 74/459
[58] Field of Search ........ 74/89.15, 424.8 R, 424.8 B, 74/424.8 C, 458, 459

[56] References Cited

U.S. PATENT DOCUMENTS

| 150,136 | 4/1874 | Coffin | 74/458 |
|---|---|---|---|
| 3,173,304 | 3/1965 | Strandgren | 74/424.8 C |
| 3,214,991 | 11/1965 | Perrin | 74/424.8 C |
| 3,406,584 | 10/1968 | Roantree | 74/424.8 B |
| 3,508,452 | 4/1970 | Roantree | 74/89 |
| 3,585,869 | 6/1971 | Lemor | 74/459 |
| 3,595,094 | 7/1971 | Lemor | 74/424.8 C |
| 4,375,770 | 3/1983 | Druet | 74/459 |
| 4,526,053 | 7/1985 | Carson | 74/89.15 |

FOREIGN PATENT DOCUMENTS

| 995011 | 11/1951 | France | 74/424.8 C |
|---|---|---|---|
| 144516 | 3/1954 | Sweden | 74/459 |
| 165232 | 11/1958 | Sweden | 74/424.8 C |

*Primary Examiner*—Lawrence Staab
*Attorney, Agent, or Firm*—Cushman, Darby & Cushman

[57] ABSTRACT

A device for translating a rotary motion to a linear one consisting of a first elongate body (1) provided with screw threads extending along the body and a second body (5) rotatable coaxially with the first body. A number of rollers (3) are arranged between the first and the second body with the axes of the rollers parallel to the axes of the bodies and provided with threads meshing with the screw threads of the first body, the first body being provided with teeth extending substantially along the entire body. Moreover, the rollers have teeth cooperating with the teeth of the first body, one body being displaced relative to the other at the turning of the bodies relative to one another. The second body (5) has threads (6) cooperating with the threads (4) of the rollers (3), and teeth (11) cooperating with the teeth (9) of the rollers. The threads (2, 4, 6) of the first body (1), the rollers (3) and the second body (5) are trapezoidal threads, the threads of the rollers (3) and the threads of the second body (5) having the same turning direction and the threads of the first body (1) having a turning direction opposite to the turning direction of the rollers and the second body. The pitch circle (14) of the teeth (8) of the first body (1) is located at some distance from the average diameter (15) of the threads (2) of the first body (1) and the pitch circle (16) of the teeth of each roller (3), respectively, is located at some distance from the average diameter (17) of the threads (4) of the roller.

5 Claims, 4 Drawing Figures

DEVICE FOR TRANSLATING A ROTARY MOTION TO A LINEAR ONE

This invention relates to a device for translating a rotary motion to a linear one, as indicated in the preamble of claim 1.

Thus, known devices of this kind use freely rotatable wheels or rollers mounted in one of the parts displaceable relative to each other, which rollers cooperate via ribs or cams with the threads of the other part. By turning one part the rollers will roll with the cams meshing with the threads displacing the second part in this way. The ribs or cams of the roller may then be parallel lying in planes extending perpendicularly to the roller shaft or form threads corresponding to the threads of the threaded part. At such devices it is required that the rollers must be exactly guided and driven by the second part and abut and engage the threads thereof all the time. As soon as an obliquity between roller and the threaded part appears or a roller is released from this, resulting in different rolling velocity, the device will inevitably seize. Due to the fact that a relative movement between the screw and the roller or rollers cannot be prevented there is a risk that the entire device must be dismounted to be restored to an operable state if it is driven to far, that is to a stop in an outer position. Another very great problem of known devices of this type is that it is very difficult to obtain self-braking, i.e. the device should be stationary without a separate brake even at the greatest load. So far no solution has been found, either, to achieve self-braking of this type of devices.

It is possible by the present invention, as it is apparent from the characterizing portions of the claims, to eliminate the disadvantages mentioned above and associated with the so far known mechanisms of the type intended here so as to translate a rotary motion to a linear one and to achieve a perfect self-braking of the device, even if materials of a very low coefficient of friction are used such as hardened steel against hardened steel.

Figure 2:
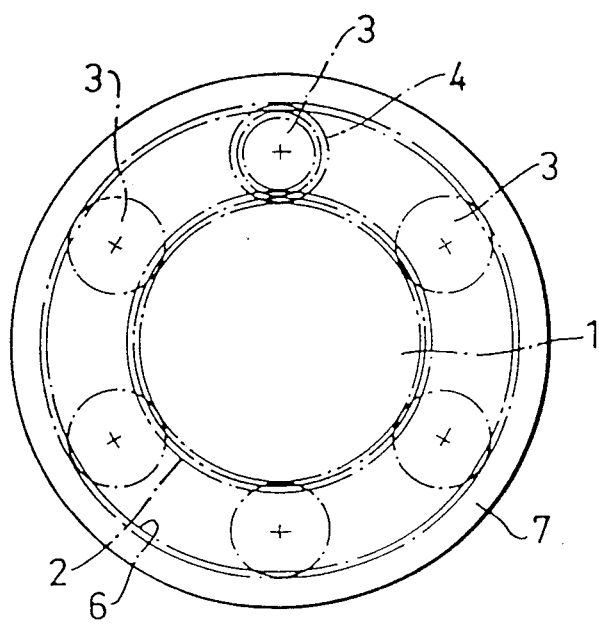
Figure 3:
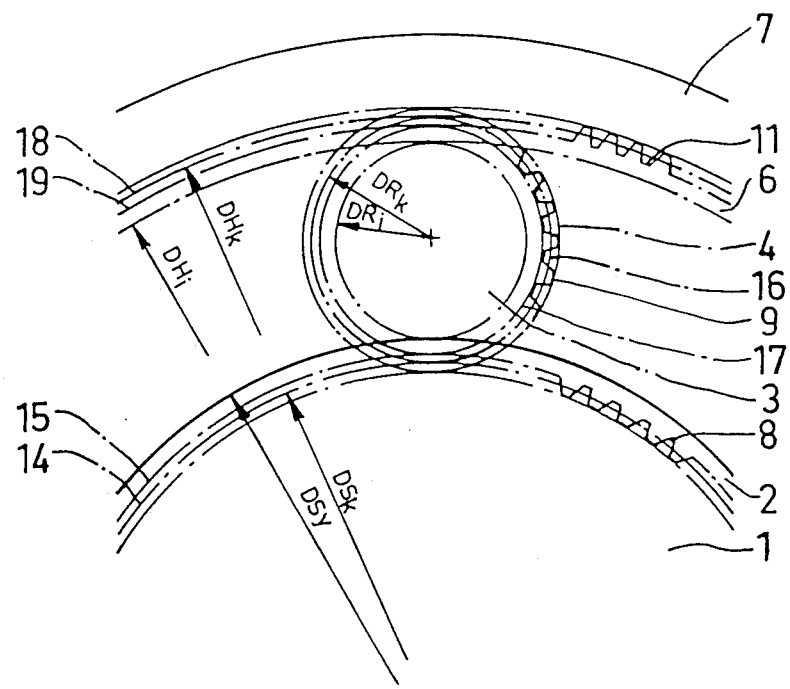

The invention will be described in greater detail in the form of an example with reference to the drawing, wherein FIG. 1 shows the central part of the invention partially in side elevation, FIG. 2 shows a cross section of the invention and FIG. 3 shows a detail of the invention on an enlarged scale as compared with FIGS. 1 and 2.

Figure 4:
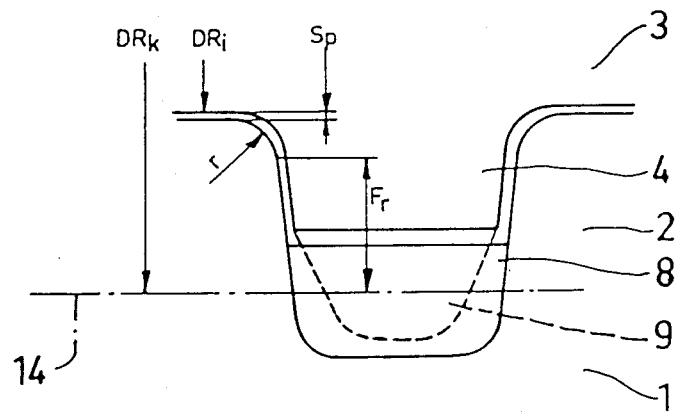

FIG. 4 shows graphically a detail of the device according to the invention.

The figures only show the very inventive thought in detail while the rest of the machine element, in which the invention is included, is omitted. In general it can be said that this consists of a threaded screw mounted in a suitable way and driven e.g. by an electric motor. A housing for supporting the rollers cooperating with the threaded screw can be connected to an axially displaceable sleeve surrounding the screw. Of course the housing or sleeve can instead be driven by an electric motor via e.g. a gear reduction set, whereby the housing or sleeve at a stationary screw will move axially along the screw.

1 denotes a screw or an axle provided with threads 2. A number of rollers 3 provided with threads 4 engaging the threads 2 of the axle 1 cooperate with the threaded axle 1. A housing 5 is arranged about the axle 1 and consists of a cylinder 7 provided with internal threads 6.

The threads 6 of the cylinder cooperate with the threads 4 of the rollers 3 evenly spaced between the housing 5 and the screw 1. The threads 2, 4 and 6 consist of trapezoidal threads. In the example shown the screw 1 has left-hand threads, the rollers 3 right-hand threads and the housing 5 or the cylinder 7 right-hand threads as well.

As will be described below more in detail the threads 2 of the screw 1 are provided with teeth 8 within the root area. In the range of the thread tops each roller 3 is provided with a toothing or teeth 9 meshing with the teeth 8 of the screw. Two rings 10 which are provided with cog teeth 11 on their insides are locked to the cylinder 7. The cog teeth 11 and the teeth 9 of the rollers coact with one another. Fixation of the rings 10 to the cylinder 7 can be effected by means of e.g. clamping rings 13 provided with threads 12 so that they can be screwed onto the cylinder 7. As is apparent from FIG. 1 these will clamp the rings 10 against the cylinder 7 when tightened. It is to be understood that the rings 13 can be locked in a clamping position relative to one another and the cylinder 7.

In the example shown the screw 1 has a threaded lead, the rollers 3 also a threaded lead and the housing or cylinder 7 five such leads. The number of rollers 3 is six and the rollers are guided with respect to their movement completely by geometry and the teeth 8, 9 and 11 without any roller holders being necessary.

As is more closely apparent from FIG. 3 the pitch circle 14 of the teeth 8 of the screw 1 is spaced according to the invention inside the nominal diameter 15 of the threads 2 of the screw. The pitch circle 16 of the teeth 9 of each roller 3 is spaced outside the nominal diameter 17 of the thread 4 of each roller. The pitch diameter 18 of the teeth of the housing or cylinder 7 is radially spaced inside the nominal diameter 19 of the threads 6 of the cylinder 7.

By this configuration, that is with the same thread turning in roller 3 and housing 5 but different from the thread turning of the screw 1 a gear change of the device is obtained according to the formula $$U_t = \frac{DS_k \cdot \pi}{R}$$

where $DS_k$ = the average diameter of the teeth 8 of the screw 1 (designated 14 above for the sake of clearness) and where R is the longitudinal displacement of the housing 5 for one turn of the screw 1 and is derived from the formula $$R = S - S\frac{DS_k}{2(DS_k + DR_k)} - S\left[\left(1 - \frac{DS_k}{2(DS_k + DR_k)}\right)\frac{DS_k}{DR_k}\right]$$

where
 S = the pitch
 $DR_k$ = the average diameter of the teeth of the roller 3 (previously designated 16 for the sake of clearness).

In accordance with the invention, with rollers exactly guided between screw and housing and with the gear exchange as above it is possible to accomplish a complete self-braking action of the device, i.e. also at maximum load (also overload) in stationary position the device remains immobile.

The frictional moment of the device at rest is obtained from the formula $$M_{\mu v} = P \cdot F_r \mu_v \cdot 2$$

where

P=the axial load of screw (roller, housing)
$F_r$=friction radius and
$\mu_v$=the coefficient of friction between the parts (screw-roller, roller-housing) of the device at rest.

The friction radius is derived from the formula $$F_r = \frac{DR_k - DR_i}{2} - S_p - r$$

where $DR_i$=the inside diameter of the threads of the roller
$S_p$=the play between roller-housing and roller-screw, respectively (i.e. total play) and
r=the edge radius of the thread of the screw (housing).

In FIG. 4 it is shown schematically how $F_r$ can be interpreted graphically. By varying the friction radius it is thus possible to actuate the frictional moment, i.e. the self-braking. It is to be understood that the calculations made above of course also apply to the engagement of the roller with the housing utilizing the current magnitudes. Thus, it is possible by the present invention to "build-in" self-braking with a stationary device by achieving an enforced relative movement between the thread flanks being in engagement with each other. Thus, complete self-braking is possible also when using e.g. hardened steel—hardened steel. As the coefficient of friction at motion (dynamical friction) at this material is about three times lower than at rest the self-braking effect will not influence the device in operation to a large degree. When using hardened steel against hardened steel an efficiency of up to 90% is obtained. As mentioned above, FIG. 4 is a graphical representation showing schematically the engagement between the threads and teeth of the screw 1 and a roller 3. The teeth of the screw are shown with a dashed line in the figure.

Using similar thread turning in housing and rollers and an opposite thread turning in screw together with an exact guiding of the motion of the rollers relative to screw and housing a faultless, smooth operation of the device with a normally opposite direction of motion of the housing relative to the turning direction of the screw is obtained. At clockwise turning of the left-hand screw the housing will thus "be screwed onto the screw". Thus, it is possible according to the invention with the selected thread profile and the reciprocal ratio between the pitch and average diameters of coacting teeth and threads, respectively, to achieve a self-braking screw—nut device which has not been possible before.

The pitch circle of the teeth of the screw can of course, within the scope of the invention, be spaced outside the average diameter of the screw threads. In practice the teeth can then be arranged on the thread tops of the screw with a corresponding placement of the pitch circle of the teeth of the relative roller spaced inside the average diameter of the threads of the roller. The demand is still exact guiding, thread geometry and friction radius.

What I claim is:

1. A device for translating a rotary motion to a linear one comprising a first elongate body provided with screw threads extending along the body and a second body rotatable coaxially with the first body, a plurality of rollers arranged between the first and the second body with the axes of the rollers parallel to the axes of the bodies and provided with threads engaging the screw threads of the first body, the first body being provided with teeth extending substantially along the entire body, and that the rollers have teeth cooperating with the teeth of the first body, one body being displaced relative to the other upon turning of the bodies relative to each other, characterized in that the second body has threads cooperating with the threads of the rollers, that the second body has teeth cooperating with the teeth of the rollers, that the threads of the first body, the rollers and the second body are trapezoidal threads, that the threads of the rollers and the threads of the second body have the same turning direction and the threads of the first body have a turning direction opposite to the turning direction of the rollers and the second body and that the pitch circle of the teeth of the first body is located at a radial distance from the nominal diameter of the threads of the first body and the pitch circle of the teeth of the roller is located at a radial distance from the nominal diameter of the threads of the roller.

2. The device of claim 1, characterized in that the first body has the shape of a screw and the second body the shape of a sleeve.

3. The device of claim 1, characterized in that the pitch circle of the teeth of the first body is located at a distance inside the nominal diameter of the threads of the first body and the pitch circle of the teeth of the roller is located at a distance outside the nominal diameter of the threads of the roller.

4. The device of claim 1, characterized in that said distance determines the frictional moment of the device at rest, which moment is defined by the formula $P \cdot Fr \cdot \mu_v \cdot 2$, where P=the axial load of cooperating parts, $\mu_v$=the coefficient of friction between the parts at rest and the radius of friction $$Fr = \frac{DR_k - DR_i}{2} - S_p - r,$$

where $DR_k$=the nominal diameter of the teeth of the relative roller, $DR_i$=the inside diameter of the threads of the relative roller, $S_p$=the play between cooperating parts and R=the edge radius of a thread in the first body and the second body.

5. The device of claim 1, characterized in that the gear change $U_t$ is obtained from the formula $$U_t = \frac{DS_k \cdot \pi}{R},$$

where R is the longitudinal displacement of the second body of one turn of the first body and is derived from the formula $$R = S - S \frac{DS_k}{2(DS_k + DR_k)} - S \left[ \left( 1 - \frac{DS_k}{2(DS_k + DR_k)} \right) \cdot \frac{DS_k}{DR_k} \right]$$

where S=the pitch, $DS_k$=the nominal diameter of the teeth of the first body and $DR_k$=the nominal diameter of the teeth of the relative roller.

* * * * *